US011205085B1

(12) United States Patent
Qvarfort (10) Patent No.: US 11,205,085 B1
(45) Date of Patent: Dec. 21, 2021

(54) SYSTEMS AND METHODS FOR INTENSITY GUIDED INTERACTIVE MEASUREMENT

(71) Applicant: GE Precision Healthcare LLC, Wauwatosa, WI (US)

(72) Inventor: Matz Qvarfort, Ekerö (SE)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 0 days.

(21) Appl. No.: 16/942,308

(22) Filed: Jul. 29, 2020

(51) Int. Cl.
| G06K 9/00 | (2006.01) |
| G06K 9/32 | (2006.01) |
| G06T 7/00 | (2017.01) |
| G06K 9/62 | (2006.01) |
| G06T 7/13 | (2017.01) |

(52) U.S. Cl.
CPC ......... G06K 9/3233 (2013.01); G06K 9/6215 (2013.01); G06T 7/0012 (2013.01); G06T 7/13 (2017.01)

(58) Field of Classification Search
None
See application file for complete search history.

(56) References Cited

U.S. PATENT DOCUMENTS

| 6,490,534 | B1 | 12/2002 | Pfister |
| 7,170,517 | B2 * | 1/2007 | Raman ..................... G06T 7/60 |
| | | | 345/419 |
| 8,773,526 | B2 * | 7/2014 | Bryll ................... G06K 9/2027 |
| | | | 348/94 |
| 9,291,450 | B2 | 3/2016 | Takahashi |
| 9,927,222 | B2 | 3/2018 | Suzuki et al. |
| 10,360,673 | B2 * | 7/2019 | Huang ................. G01B 9/0203 |
| 2019/0029526 | A1 * | 1/2019 | Hashizume ............... G06T 7/62 |

FOREIGN PATENT DOCUMENTS

WO 2013059599 A1 4/2013

* cited by examiner

*Primary Examiner* — Soo Jin Park
(74) *Attorney, Agent, or Firm* — The Small Patent Law Group LLC; Dean D. Small (57) ABSTRACT

A method is provided for measuring using images. The method includes displaying an image having varying intensities. The method also includes identifying an analysis line passing through at least one feature of the image. Further, the method includes displaying an intensity graph over the image. The intensity graph includes a first axis extending along the analysis line and a second axis corresponding to intensities of points of the image along the analysis line. The method also includes identifying points of interest along the analysis line based on the intensity graph. Also, the method includes measuring at least one distance between at least two of the points of interest.

20 Claims, 4 Drawing Sheets

SYSTEMS AND METHODS FOR INTENSITY GUIDED INTERACTIVE MEASUREMENT

BACKGROUND

The subject matter disclosed herein relates generally to imaging systems, and more particularly to measurement of features of an image.

In various modalities of medical imaging, the measurement of size and/or distance may be important (e.g., to help provide a proper diagnosis), and are often part of a clinical evaluation of images. Various conventional approaches rely on measurement process performed by users evaluating distance, size, or form by visually estimating aspects of the images. A tool may be used to mark anatomical or functional aspects of an image. Such approaches have several drawbacks. For example, the accuracy of the analysis depends on the visual acuity and judgment of the user. Also, images of low resolution may not be clearly visible. Further still, the use of user-defined limits may lead to variability between users.

BRIEF DESCRIPTION

In accordance with an embodiment, a method is provided for measuring using images. The method includes displaying an image having varying intensities. The method also includes identifying an analysis line passing through at least one feature of the image. Further, the method includes displaying an intensity graph over the image. The intensity graph includes a first axis extending along the analysis line and a second axis corresponding to intensities of points of the image along the analysis line. The method also includes identifying points of interest along the analysis line based on the intensity graph. Also, the method includes measuring at least one distance between at least two of the points of interest.

In accordance with another embodiment, a system is provided that includes a display unit and at least one processor. The display unit is configured to display an image having varying intensities. The at least one processor is configured to identify an analysis line passing through at least one feature of the image; display an intensity graph over the image, with the intensity graph including a first axis extending along the analysis line and a second axis corresponding to intensities of points of the image along the analysis line; identify points of interest along the analysis line based on the intensity graph; and measure at least one distance between at least two of the points of interest.

DETAILED DESCRIPTION

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for intensity guided measurement of images (e.g., medical images). Various embodiments provide an intensity guided interactive measurement tool (IGIMT) configured to assist a user in determining distances (e.g., sizes of features and/or distances between features) in an image. Various embodiments help provide accurate and repeatable measurements of various features of images in a variety of imaging modalities.

Various embodiments provide measurements of functional and/or anatomical structures with interactive assistance using measurement triggers in an intuitive and direct fashion. For example, full width half maximum, full width tenth maximum, local maxima, and/or local minima may be utilized. Displayed indications along with automatic snapping to pre-identified points of interest may be utilized in various embodiments.

In various embodiments, a guiding intensity graph is generated using a multi-point interpolation scheme which helps make graphs smoother and more intuitive to users. Various embodiments allow a user to zoom in on substructures and still have a smoot and information-rich graph that allows location of defined curve properties. The curve or graph may have an image resolution size independent curve, allowing for use with many input image characteristics.

Various embodiments may be used to measure sizes of tumors, organs, anatomical structures, functional defects, cavities, or the like, and/or distances between organs, structures, tumors, or the like.

A technical effect of at least one embodiment includes improved quality (e.g., accuracy) of image measurements. A technical effect of at least one embodiment includes improved consistency or repeatability for image measurements. A technical effect of at least one embodiment includes quicker performance of image measurements. A technical effect of at least one embodiment includes improved interactivity and/or simplicity of performing image measurements.

Before describing particular example embodiments, a general overview of various aspects of image display that may be used in connection with intensity guided interactive measurement in accordance with various embodiments is provided. In various embodiments, an IGIMT may be defined and displayed within an existing environment, such as a workstation. Further the IGIMT may be understood as operating within an image context. As used herein, an image context defines or relates to a workstation's capability of displaying images from various patient scanning sources (e.g., CT, MR, PET, and NM imaging modalities). While different modalities have different characteristics, within an image context a user may apply knowledge to understand how a generic image intensity relates to real-life parameters (e.g., density of structures, functional blood flow, activity uptake, resonance). Generally, measurements taken within an image context may be translated to a real life parameter representation for a particular modality.

For example, an image context in various embodiments defines an image as a matrix of intensity $I[x,y]$, where $x=0 \ldots X$, and $y=0 \ldots Y$, for some X and Y which may depend on the image modality. For example, typical values for NM may be $NM_x=NM_y=128$. As another example, typical values for PET may be $PET_x=PET_y=128$. As another example, typical values for MR may be $MR_x=MR_y=256$. As one more example, typical values for CT may be $CT_x=CT_y=512$.

Images may be displayed in 2-dimensions (2D), 2.5 dimensions (2.5D), or 3 dimensions (3D). For example, a 2D image may be defined as $I[x,y]$. 2.5D images in various embodiments include a set of connected 2D images of a common subject viewed from different perspectives. A 3D image in various embodiments represents an array of Z images, $I[X,Y][Z]$.

Displays in various embodiments are representations of imaging data within a patient orientation (patient space) that are transformed to image space, and then transformed to display space. Further, users may be allowed to configure the display.

Generally, the IGIMT in various embodiments includes a visual interactive tool that includes a line, a graph, a set of graph characteristics indicators, a set of user controllers, and a set of automatic or semi-automatic behaviors. (FIG. 3, discussed in more detail below, may be understood as representing aspects of a tool utilized in various embodiments.)

The line used may be defined by a user directly on an image that is within a current image context (e.g., being displayed to a user). Generally, some device (e.g., mouse, pen, touch-screen) is used to indicate the start and end of a line. A graph showing intensities along the line may be generated interactively while the user defines the line.

The curve for the intensity graph may be calculated using defined aspects of the image context. For example, a set of definitions used to create the curve may include a number of points N (e.g., a number of display pixels of a line, or a threshold or limit on the number of points). Also, each point $C_n$, for $n=(0,N)$, may be calculated using nearest-neighbor, bi-linear interpolation, or bi-cubic interpolation techniques.

Figure 1:
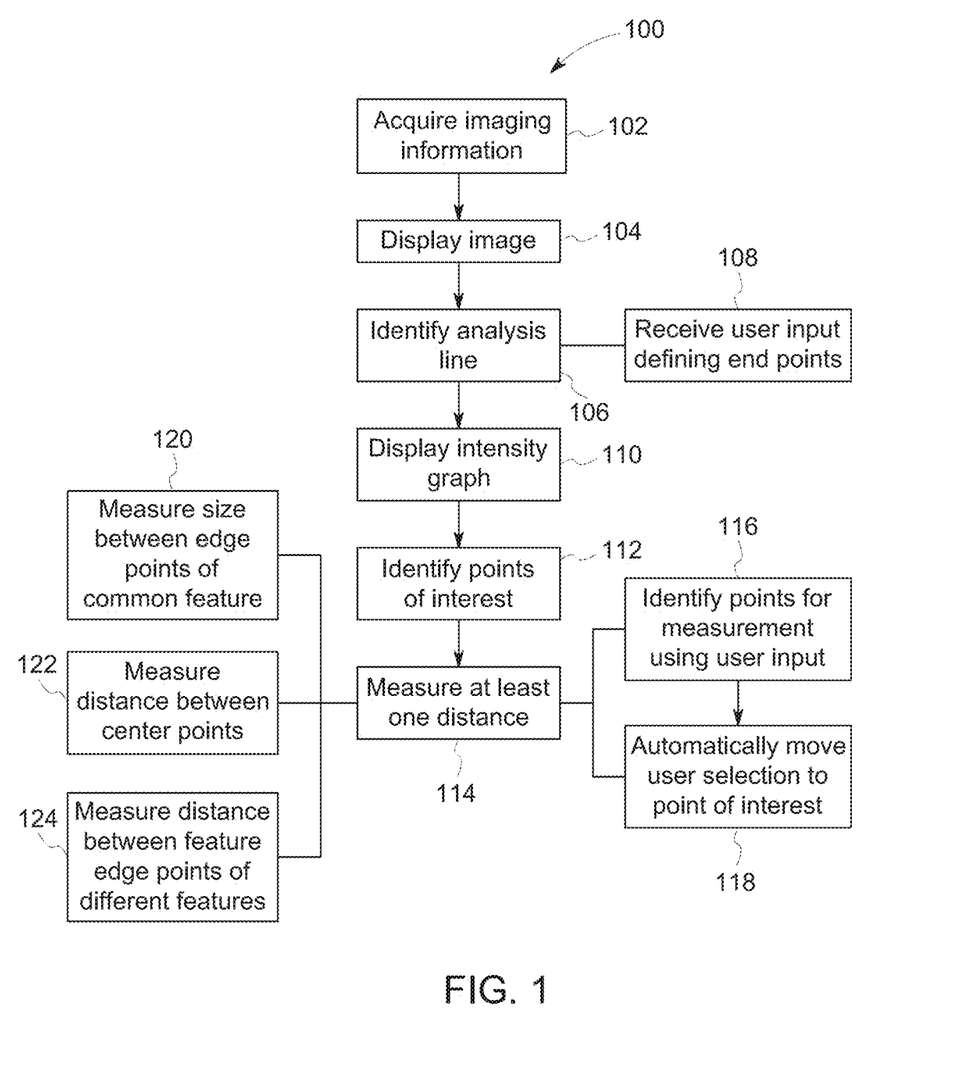
FIG. 1 shows a flowchart of a method, according to an embodiment.

FIG. 1 provides a flowchart of a method 100 (e.g., for measuring aspects of an image, such as a medical image), in accordance with various embodiments. The method 100, for example, may be used to measure the size of a tumor, or, as another example, the distance of a tumor from an organ. The method 100, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. For example, steps of generating analysis lines, generating intensity graphs, and determining points of interest may be updated and revised or repeated on an interactive basis responsive to inputs from a user or operator. In various embodiments, portions, aspects, and/or variations of the method 100 may be able to be used as one or more algorithms to direct hardware (e.g., one or more aspects of the processing unit 630 discussed herein in connection with FIG. 6) to perform one or more operations described herein.

At 102, imaging information is acquired. The imaging information, for example, may be acquired with a medical imaging system including one or more modalities. Example modalities that may be utilized in various embodiments include nuclear medicine (NM) imaging, computed tomography (CT), magnetic resonance (MR) imaging, single photon emission computed tomography (SPECT), and positron emission tomography (PET).

Figure 2:
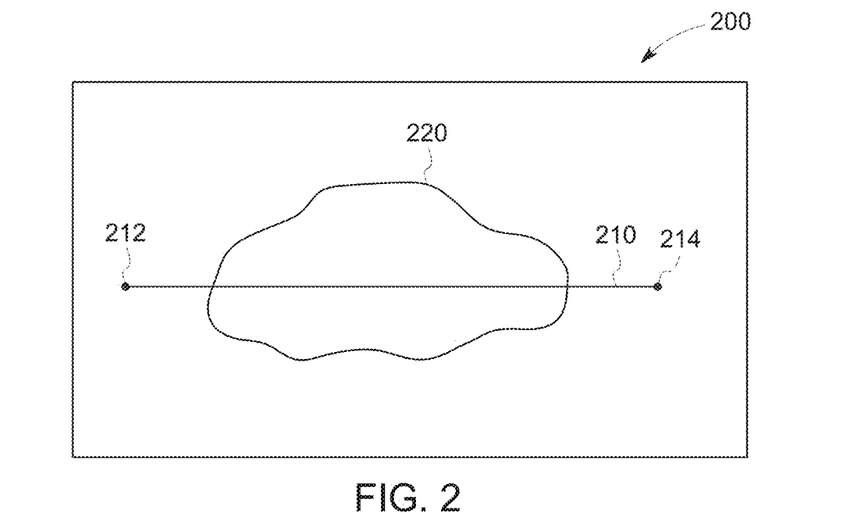
FIG. 2 shows an example image, according to an embodiment.

At 104, an image is displayed. The image has varying intensities corresponding to aspects of a volume (e.g., human patient or portion thereof). For example, the intensities may correspond to uptake of a radiotracer at various portions within the imaged volume. As another example, the intensities may correspond to tissue density within the imaged volume. FIG. 2 illustrates an example image 200. The image 200 includes a feature 220. For example, the feature 220 may be a tumor that has a relatively higher intensity than surrounding portions of the image due to increased uptake of a radiotracer. As another example, the feature 220 may be an organ or other anatomical structure. It should be noted that only one feature is shown in FIG. 2 for ease and clarity of illustration, and that multiple features may be present in a single image for analysis in various embodiments.

At 106, an analysis line is identified. The analysis line passes through at least one feature of the image. For example, with continued reference to FIG. 2, the depicted analysis line 210 passes through the feature 220 of the image

200. Generally, the line is identified to pass through one or more portions of interest of the feature 220. For example, the line may be selected or identified to pass through a center of the feature 220 and/or to pass through one or more desired edge points of the feature 220. The line in the depicted example passes beyond the exterior of the feature 220, allowing an intensity graph to be generated as discussed herein to cover the entire feature 220.

In the illustrated example, at 108, the analysis line is identified by receiving a user input that defines endpoints of the analysis line. For example, in the example depicted in FIG. 2, the analysis line 210 passes between a first endpoint 212 and a second endpoint 214. The first endpoint 212 and second endpoint 214 may be identified via use of one or more of a mouse, stylus, cursor, or touchscreen. For example, a user viewing the feature 220 may direct the selection of the first endpoint 212 and second endpoint 214 via a cursor displayed on the image 200. After selection of the endpoints, the resulting analysis line 210 is displayed to the user, who can then modify the positions of one or more endpoints as desired. In other embodiments, the line may be automatically selected based on identified features (e.g., features identified using image recognition software) of the image for a known diagnostic task. In still other embodiments, an automatically selected analysis line may be presented to a user, who may then select the line for use, or modify one or more endpoints of the line.

The orientation of the analysis line generally is selected based on one or more desired measurements. For example, to measure the distance between centers of two features, the analysis line may be oriented to pass through the centers of the two features. As another example, the measure the size of a feature, the analysis line may be oriented to pass through the center of the feature. It may further be noted that additional analysis lines or shapes may be selected by a user or otherwise employed in various embodiments. For example, a first analysis line may be oriented in a first direction, and a second analysis line may be oriented in a second direction (e.g., perpendicular to the first direction), with corresponding intensity graphs provided for each analysis line. As another example, a user may indicated a box, circle, or other shape, and one or more analysis lines generated based on the indicated box, circle, or other shape.

Figure 3:
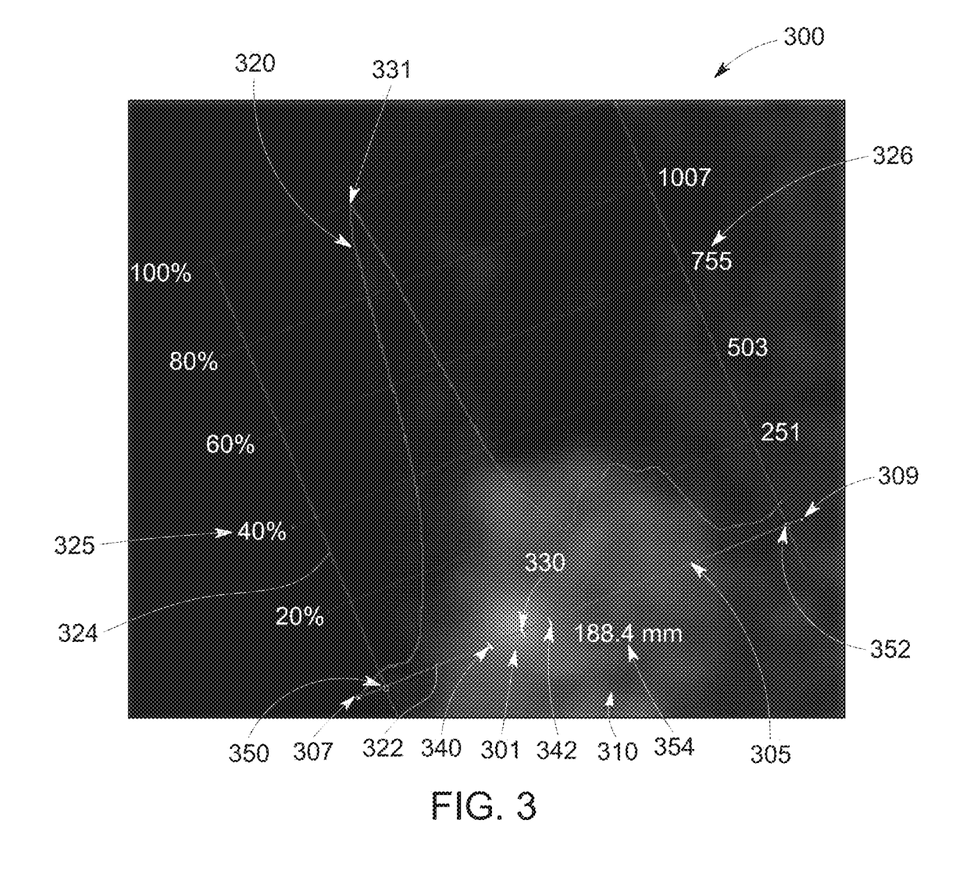
FIG. 3 shows an example combined image including a medical image and an intensity graph, according to an embodiment.

With the analysis line 210 identified, an intensity graph may be generated using the analysis line and the intensities of the image on the points or voxels along the analysis line. In the illustrated example, at 110, an intensity graph is displayed over the image (e.g., overlaying the image). FIG. 3 provides an example of a combined image 300 that includes an image 310 (e.g., displaying one or more features of an imaged volume including feature 301) and a corresponding intensity graph 320. The depicted intensity graph 320 includes a first axis 322 and a second axis 324. The first axis 322 extends along the analysis line 305 (which extends between first endpoint 307 and second endpoint 309), and the second axis 324 extends perpendicular to the first axis 322 in the illustrated example. The second axis 324 corresponds to intensities of points (e.g., pixels or voxels) of the image 310 along the analysis line. The intensities may be displayed in relative and/or absolute terms. For example in the illustrated example, a first scale 325 displays relative intensities, and a second scale 326 displays absolute intensities in a selected or predetermined metric. The intensity graph 320 in various embodiments is used to perform or guide measurement of one or more aspects of the image 310 (e.g., feature 301). It may be noted that, in embodiments using multiple views of the same image, the analysis line may be selected in a single view and displayed, along with the intensity graph, in other views.

At 112, one or more points of interest are identified along the analysis line. The points of interest are identified based on or using the intensity graph. The points of interest in various embodiments may be automatically generated, or, as another example, may be automatically initially generated and displayed to a user, who may make adjustments or modifications. In various embodiments, the points of interest may be identified based on statistical measures of the values on the intensity graph, and correspond to structural aspects of a feature (or features being analyzed). The particular type (or types) of points of interest identified for a given application may be automatically selected based on a known diagnostic use for which an image is being used, and/or may be selected or specified by a user.

For example, in various embodiments, the points of interest include a peak intensity point. In the example depicted in FIG. 3, a peak intensity point 330 for feature 301 is indicated along the analysis line 305, and indicates the point along the analysis line 305 that corresponds to the peak 331 or location of highest intensity of the intensity graph 320. The peak may be selected by identifying the highest intensity value along the analysis line. As another example, multiple peaks may be selected by identifying local maxima in intensity along the analysis line. Peaks may be used, for example, to identify centers of features of interest (e.g., point of maximum uptake of a radiotracer, or point of highest concentration of a contrast agent).

As another example, in various embodiments, the points of interest include a full-width-half-maximum (FWHM) point. In the example depicted in FIG. 3, a first FWHM point 340 and a second FWHM point 342, corresponding to and on either side of the peak 331, are indicated along the analysis line 305. It may be noted that other fractions, such as full-width-tenth-maximum may be used in other embodiments. In various embodiments, two FWHM points are identified for a corresponding feature (on either sides of the peak of the feature), and may be used, for example, to identify edges or borders of features.

As another example, in various embodiments, the points of interest include a center point that is halfway between the edge points (e.g., FWHM points). For example, a point halfway between the first FWHM point 340 and the second FWHM point 342 may be identified in various embodiments, and used as a center (e.g., geometric center) of a feature. In some embodiments, multiple analysis lines may be used to locate a center of a feature. For example, after a center has been identified (e.g., using either a peak or a halfway point between two FWHM points) in one dimension along a first analysis line, a second analysis line that is perpendicular to the first analysis line may be generated through the identified center. A second center located using the second analysis line may then be identified to locate the center of the feature in two dimensions.

With continued reference to FIG. 1, at 114, at least one distance is measured between at least two points of interest. The points between which measurements are taken may be manually selected by a user and/or automatically selected based on identified points of interest.

For example, in the illustrated example, at 116, two points of interest are identified using a user input. The user input may be provided by a user viewing an image and intensity graph using a mouse, touchscreen, or other device (e.g., by positioning a cursor to indicate points). In the example depicted in FIG. 3, a first user selected point 350 and a second user selected point 352 are shown, with the distance 354 between points 350 and 352 displayed automatically following the selection. The distance may be expressed in a predetermined dimension using conventional scaling techniques from the displayed image.

In some embodiments, the user may select a point of interest that has been identified (e.g., based on a statistical measure of the intensity graph). In the illustrated example, at 118, a user selection is automatically moved to a point of interest. For example, points of interest (e.g., points identified at 112) may be displayed. A user may then position a cursor to indicate a point via the user selection. A point of interest proximate the user selected point (e.g., within a threshold distance or threshold number of pixels or voxels of the user selected point) is then automatically selected, with the user selected point being magnetized or snapped to a closely located, previously identified point of interest. Various aspects of an imaged volume may be measured using identified points of interest.

Figure 4:
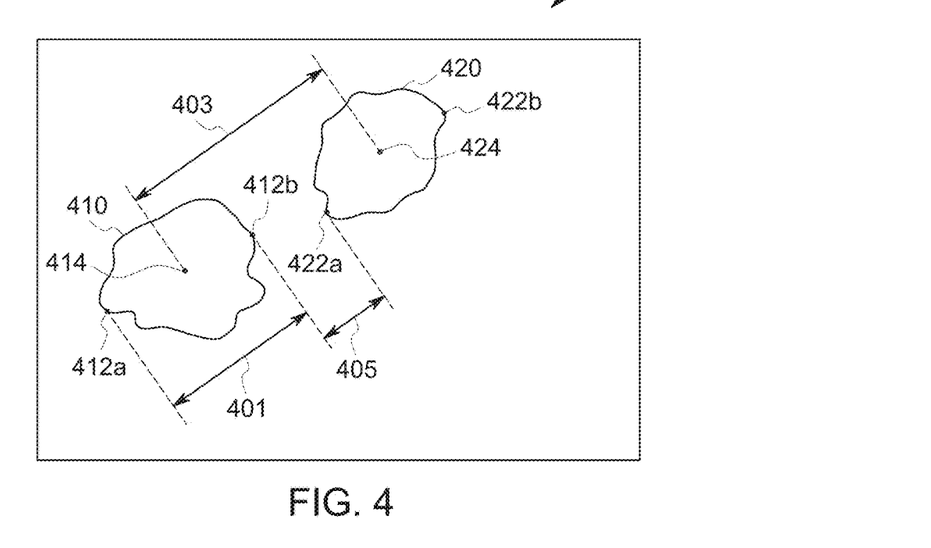
FIG. 4 shows an example of measurement, according to an embodiment.

For example, at 120, a size between a first edge point and a second edge point of a common feature is measured. The distance between the first edge point and the second edge point may be used to determine a width of the feature. FIG. 4 illustrates an image 400 with various measurements indicated. FIG. 4 includes a first feature 410 and a second feature 420. Each feature may represent, for example, a tumor or lesion, or, as another example, an organ. First feature 410 includes first feature edge points 412a, 412b, and second feature 420 includes second feature edge points 422a, 422b. The edge points may be determined using or correspond to, for example, FWHM points of interest as discussed herein. First feature 410 also includes center point 414, and second feature 420 includes center point 424. To measure a size (e.g., width) of the first feature 410, distance 401 between first feature edge points 412a and 412b may be used. Additional analysis of lines in different orientations may be used to obtain the size of a feature in multiple dimensions.

As another example, at 122, a distance between a center point of a first feature and a center point of a second feature may be measured. For instance, in the example depicted in FIG. 4, distance 403 between center 414 of first feature 410 and center point 424 of second feature 420 may be measured.

Figure 5:
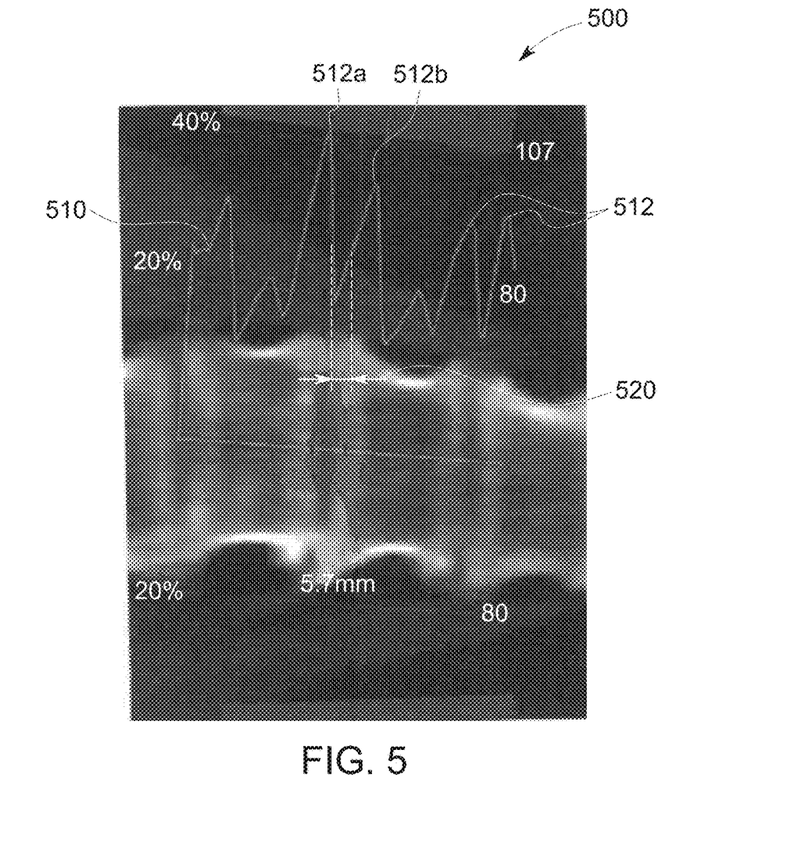
FIG. 5 shows an image and corresponding intensity graph having multiple peaks, according to an embodiment.

As one more example, at 124, a distance between a first feature edge point of a first feature and a second feature edge point of a second feature may be measured (e.g., to determine the amount of space between features). For instance, in the example depicted in FIG. 4, distance 405 between first feature edge point 412b of first feature 410 and second feature edge point 422a of second feature 420 may be measured. As another example, FIG. 5 illustrates an image 500 of vertebrae, with corresponding intensity graph 510 having multiple peaks 512. FHWM points for adjacent peaks 512a, 512b may be identified using the intensity graph 510 and used to determine a distance between adjacent vertebrae to measure a thickness 520 of a vertebral disc.

Figure 6:
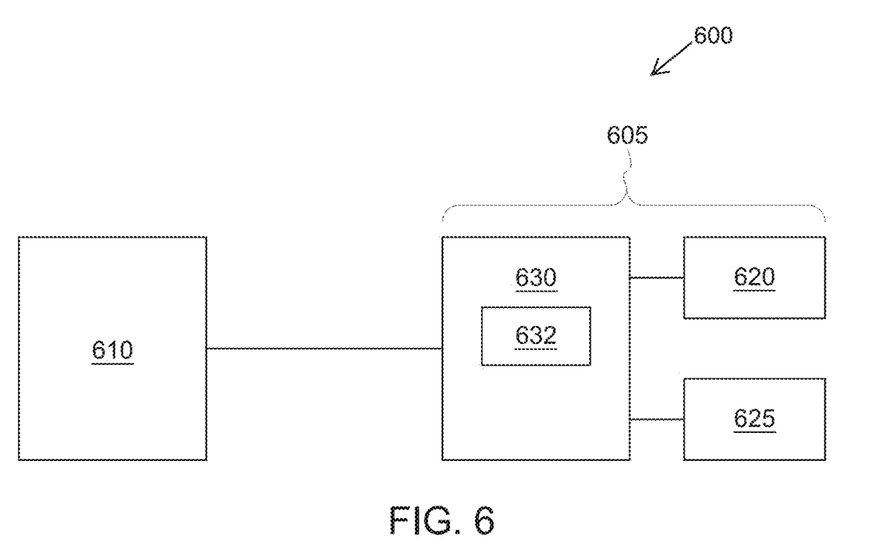
FIG. 6 shows embodiment block schematic diagram of a system, according to an embodiment.

FIG. 6 provides a schematic view of a system 600. The system 600 may be configured, for example, to perform or utilize one or more aspects of the method 100 discussed herein. As seen in FIG. 6, the system 600 includes an acquisition unit 610, a display unit 620, and a processing unit 630. Generally, the acquisition unit 610 acquires imaging information, which is used to analyze (e.g., measure aspects of one or more features of an imaged volume) the imaging information via the display unit 620 and the processing unit 630.

The acquisition unit 610 in various embodiments is an imaging system that is configured to acquire imaging information in one or more modalities (e.g., CT, NM, PET, SPECT). The imaging information may be acquired for an imaging volume (e.g., human patient or portion thereof). In various embodiments, a patient may be imaged at different times to monitor progress of an aspect of an imaged volume. For example, the size of a lesion or a tumor may be determined at different times as discussed herein to monitor effectiveness of a course of treatment. The acquisition unit 610 is coupled to the processing unit 630, and provides the processing unit 630 with the acquired imaging information from a given scan (or scans). The processing unit 630 may be configured in various embodiments to control the acquisition unit 610 to acquire the imaging information, or, alternatively, may be located remotely from the acquisition unit 610 and be provided with previously acquired imaging information and/or a previously reconstructed image, for example.

The display unit 620, along with the processing unit 630, may be part of a workstation 605 that also includes an input device 625. The display unit is configured to display an image that has varying intensities (e.g., locations indicating varying tissue densities, varying radiotracer uptake, varying amount of contrast agent). The processing unit 630, for example, may reconstruct an image using imaging information from the acquisition unit 610, and display the image on the display unit 620 (e.g., monitor or screen) to a user. Using the input device 625 (e.g., keyboard, keypad, stylus, mouse, touchscreen, microphone used in connection with voice recognition software), the user may provide input to the processing unit 630, for example to generate an analysis line and/or to select points on the displayed image for measurements.

The processing unit 630 is configured (e.g., programmed) to provide interactive guidance based on the intensities for an image to help measure distances on the image as discussed herein. For example, the processing unit 630 of the illustrated example is configured to identify an analysis line passing through at least one feature of the image (e.g., using a received user input). The depicted processing unit 630 is also configured to generate an intensity graph, and display the intensity graph (e.g., intensity graph 320) over the image (e.g., via display unit 610). As discussed herein, the intensity graph has a first axis that extends along the analysis line, and a second axis that corresponds to intensities of points or portions of the image lying along the analysis line. The depicted processing unit 630 is also configured to identify points of interest along the analysis line based on the intensity graph, and to measure at least one distance between at least two of the identified points of interest as discussed herein.

In various embodiments the processing unit 630 includes processing circuitry configured to perform one or more tasks, functions, or steps discussed herein (e.g., method 100 or aspects thereof). It may be noted that "processing unit" as used herein is not intended to necessarily be limited to a single processor or computer. For example, the processing unit 630 may include multiple processors, ASIC's and/or computers, which may be integrated in a common housing or unit, or which may distributed among various units or housings. It may be noted that operations performed by the processing unit 630 (e.g., operations corresponding to process flows or methods discussed herein, or aspects thereof) may be sufficiently complex that the operations may not be performed by a human being within a reasonable time period. For example, reconstructing an image, generating an intensity graph, and performing statistical computations to determine points of interest may rely on or utilize computations that may not be completed by a person within a reasonable time period.

In the illustrated embodiment, the processing unit 630 includes a memory 632. It may be noted that various aspects of the processing unit 630 described herein may be utilized in connection with various modules of the processing unit 630. Generally, the various aspects of the processing unit 630 act individually or cooperatively with other aspects to perform one or more aspects of the methods, steps, or processes discussed herein.

The memory 632 may include one or more computer readable storage media. The memory 632, for example, may store images, including images of a series of prior examinations of a patient for comparative purposes. Further, the process flows and/or flowcharts discussed herein (or aspects thereof) may represent one or more sets of instructions that are stored in the memory 632 for direction of operations of the system 600.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

As used herein, the term "computer," "processor," or "module" may include any processor-based or microprocessor-based system including systems using microcontrollers, reduced instruction set computers (RISC), application specific integrated circuits (ASICs), field programmable gate arrays (FPGA's), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for measuring using images, the method comprising:
    displaying an image having varying intensities;
    identifying an analysis line passing through at least one feature of the image;
    displaying an intensity graph over the image, the intensity graph including a first axis extending along the analysis line and a second axis corresponding to intensities of points of the image along the analysis line;

identifying points of interest along the analysis line based on the intensity graph; and measuring at least one distance between at least two of the points of interest.

2. The method of claim 1, wherein identifying the analysis line comprises receiving a user input defining endpoints of the analysis line.

3. The method of claim 1, wherein the points of interest include a peak intensity point.

4. The method of claim 1, wherein the points of interest include a full-width-half-maximum (FWHM) point.

5. The method of claim 1, wherein the points of interest include a first FWHM point and a second FWHM point corresponding to a common feature, and wherein the points of interest further include a center point located halfway between the first FWHM point and the second FWHM point.

6. The method of claim 1, wherein the at least two of the points of interest that are measured between are identified using a user input.

7. The method of claim 6, further comprising automatically moving a user selection to a point of interest proximate to a point indicated by the user selection.

8. The method of claim 1, wherein measuring the at least one distance comprises measuring a size between a first edge point and a second edge point of a common feature.

9. The method of claim 1, wherein measuring the at least one distance comprises measuring a distance between a center point of a first feature and a center point of a second feature.

10. The method of claim 1, wherein measuring the at least one distance comprises measuring a distance between a first feature edge point of a first feature and a second feature edge point of a second feature.

11. A system comprising:
a display unit configured to display an image having varying intensities; and
at least one processor configured to:
identify an analysis line passing through at least one feature of the image;
display an intensity graph over the image, the intensity graph including a first axis extending along the analysis line and a second axis corresponding to intensities of points of the image along the analysis line;
identify points of interest along the analysis line based on the intensity graph; and
measure at least one distance between at least two of the points of interest.

12. The system of claim 11, wherein the at least one processor is configured to receive a user input defining endpoints of the analysis line.

13. The system of claim 11, wherein the points of interest include a peak intensity point.

14. The system of claim 11, wherein the points of interest include a full-width-half-maximum (FWHM) point.

15. The system of claim 11, wherein the points of interest include a first FWHM point and a second FWHM point corresponding to a common feature, and wherein the points of interest further include a center point located halfway between the first FWHM point and the second FWHM point.

16. The system of claim 11, wherein the at least one processor is configured to identify the at least two of the points of interest that are measured between using a user input.

17. The system of claim 16, wherein the at least one processor is configured to automatically move a user selection to a point of interest proximate to a point indicated by the user selection.

18. The system of claim 11, wherein the at least one processor is configured to measure a size between a first edge point and a second edge point of a common feature.

19. The system of claim 11, wherein the at least one processor is configured to measure a distance between a center point of a first feature and a center point of a second feature.

20. The method of claim 11, wherein the at least one processor is configured to measure a distance between a first feature edge point of a first feature and a second feature edge point of a second feature.

* * * * *